United States Patent [19]

Motojima

[11] Patent Number: 4,938,895
[45] Date of Patent: Jul. 3, 1990

[54] PROCESS FOR REMOVING RADIOACTIVE RUTHENIUM FROM AQUEOUS SOLUTION

[76] Inventor: Kenji Motojima, 2368-2, Senba-cho, Mito-shi, Ibaraki, Japan

[21] Appl. No.: 313,468

[22] Filed: Feb. 22, 1989

Related U.S. Application Data

[63] Continuation-in-part of Ser. No. 106,355, Oct. 9, 1987, abandoned.

[30] Foreign Application Priority Data

Oct. 9, 1986 [JP] Japan .................................. 61-239199

[51] Int. Cl.[5] .......................... G21C 19/42; G21F 9/08; G21F 9/00; C02F 1/42
[52] U.S. Cl. ..................................... 252/627; 204/1.5; 210/682; 210/719; 210/729; 210/757; 210/759; 210/781; 252/626; 252/631; 423/22
[58] Field of Search .................... 252/627, 631, 186.27, 252/186.28, 186.29, 186.41, 186.43; 210/682, 500.29, 500.3, 500.31, 500.32, 500.23; 423/249, 22; 204/1.5

[56] References Cited

U.S. PATENT DOCUMENTS 4,105,442  8/1978  Fieberg et al. .......................... 423/22
4,282,112  8/1981  Fitoussi et al. .......................... 423/22

FOREIGN PATENT DOCUMENTS 0014629  8/1980  European Pat. Off.
2701709  7/1978  Fed. Rep. of Germany .

OTHER PUBLICATIONS

Analytica Chimica Acta, 183 (1986), Kenji Motojima et al. [Determination of Traces of Ruthenium by Addition of Cerium(IV) and Atomic Absorption Spectrometry], pp. 217–223.
Journal of Radioanalytical Chemistry, vol. 6 (1970), Y. Koda [Determination of Radioruthenium Using a Polyethylene Film], pp. 345–357.
Journal of Chemical Technique and Biotechnology, vol. 29, No. 4 (1979), pp. 210–224.
Journal of Inorganic and Nuclear Chemistry, vol. 43, pp. 385–390.

Primary Examiner—Howard J. Locker
Attorney, Agent, or Firm—Birch, Stewart, Kolasch & Birch

[57] ABSTRACT

The present invention relates to a process for removing radioactive ruthenium from an aqueous solution, comprising oxidizing the ruthenium in the aqueous solution of ruthenium tetroxide, extracting the resulting ruthenium tetroxide with a halogen-free aliphatic or alicyclic hydrocarbon solvent, allowing the ruthenium tetroxide to be reduced in the solvent, and separating the precipitated solid ruthenium dioxide.

16 Claims, 5 Drawing Sheets

Removal of Ru from $Ru(NO_3)_3$–$HNO_3$ solutions

① $Ru^{3+}$ 10mg/100mℓ 3M–$HNO_3$ +2M–$Ce^{4+}$ 1mℓ

② $Ru^{3+}$ 50mg/1000mℓ 3M–$HNO_3$ +2M–$Ce^{4+}$ 3mℓ

Fig. 2  Removal of Ru from Ru(NO$_3$)$_3$-HNO$_3$ solutions

Fig. 3 Removal of Ru from Ru(NO)(NO$_3$)-HNO$_3$ solution

Fig. 4 Removal of Ru from (Ru(NO)(NO₂)₄OH)²⁻ solutions

PROCESS FOR REMOVING RADIOACTIVE RUTHENIUM FROM AQUEOUS SOLUTION

CROSS-REFERENCE TO RELATED APPLICATIONS

This is a continuation-in-part application of U.S. Ser. No. 106,355, filed Oct. 9, 1987, now abandoned.

BACKGROUND OF THE INVENTION

1. Field of the Invention

The present invention relates to a process for removing radioactive ruthenium. More specifically, the present invention relates to a process for separating and removing safely and easily ruthenium, which is a most troublesome nuclide, in nuclear fuel reprocessing.

2. Description of the Related Art

Ruthenium is contained in a large quantity in a fission product. The fission yield of ruthenium varies according to combustion conditions and time after the fission but it is as much as 10% in the case of uranium-235 or even up to 40% in the case of plutonium-239. Since ruthenium-103 (half life of 39.8 days) and ruthenium-106 (half life of 368 days) have a relatively long half life, such radioactive ruthenium is a main radioactive source among radioactive nuclides of the fission product at a certain time after irradiation.

Ruthenium has very peculiar chemical properties and can take any of all of the valencies of 0 to 8. Ruthenium forms various complexes and these complexes have complicated behaviors. Ruthenium tetroxide ($RuO_4$) in the highest oxidation state is volatile and is volatilized even at room temperature (e.g., to give an ozone smell). Accordingly, ruthenium is a most troublesome nuclide in the reprocessing of a aspent nuclear fuel.

The process most commonly adopted for nuclear fuel reprocessing at the present time is the Purex process. The main step in this process is the extraction separation step where uranium and plutonium are extracted from a solution of spent nuclear fuel in nitric acid with tributyl phosphate (TBP)/n-dodecane and most radioactive fission products are left in the aqueous phase. Accordingly, the disposal of the aqueous phase containing a large quantity of the radioactive nuclide, that is, the highly radioactive liquid waste (HALW), is an important problem. Problems caused by radioactive ruthenium in this reprocessing process are summarized below.

(1) Various complexes formed by ruthenium, especially certain nitrosyl complexes, show complicated distribution behaviors between the aqueous phase and the extract phase in the extraction with TBP/dodecane, and therefore, it is difficult to completely separate ruthenium from uranium and plutonium.

(2) In order to maintain safety, it is intended to concentrate HALW and reduce its volume and to recover nitric acid and use it again. In this case, ruthenium is oxidized by nitric acid, formed ruthenium tetroxide is volatilized and reduced on the reaction vessel wall, and ruthenium dioxide ($RuO_2$) is precipitated, whereby the radioactive level of the apparatus is increased and corrosion of the vessel wall is drastically promoted, and, in extreme cases, pipes of the apparatus are plugged. Of course, the distilled nitric acid is contaminated with vaporized ruthenium.

(3) HALW is evaporated to dryness and finally vitrified or rendered ceramic by ignition to obtain a stable solid waste. However, volatilization of ruthenium at high temperature cannot be avoided and this volatilization is a main cause of radioactive contamination.

Various measures and studies have been made in order to cope with these problems, but no definitive method for solving these problems has been developed.

SUMMARY OF THE INVENTION

The present inventor was interested in the behavior of ruthenium in nuclear fuel reprocessing and established the atomic absorption spectroscopy for a minute amount of ruthenium [K. Motojima et al., Anal. Chim. Acta. 183 (1983), 217]. Research was conducted with the goal of clarifying the chemical properties and preventing volatilization of ruthenium. As a result, The present inventor found that positive separation and removal of ruthenium is more effective than the negative means of controlling volatilization of ruthenium. Thus the present inventor completed the present invention based on this finding.

The process of the present invention can be applied not only to the solution before extraction of uranium and plutonium in the above-mentioned nuclear fuel reprocessing but also HALW formed after the extraction. According to the process of the present invention, ruthenium can be separated and removed safely and easily from the above solution or HALW. Therefore, the above-mentioned trouble caused by ruthenium in nuclear fuel reprocessing can be completely eliminated.

In accordance with the present invention, there is provided, a process for removing radioactive ruthenium which comprises oxidizing the ruthenium in an aqueous solution to ruthenium tetroxide, extracting the resulting ruthenium tetroxide with halogen-free aliphatic or alicyclic hydrocarbon solvent, allowing the ruthenium tetroxide to be reduced in the solvent, and separating the precipitated solid ruthenium dioxide.

DESCRIPTION OF THE PREFERRED EMBODIMENTS

Figure 1:
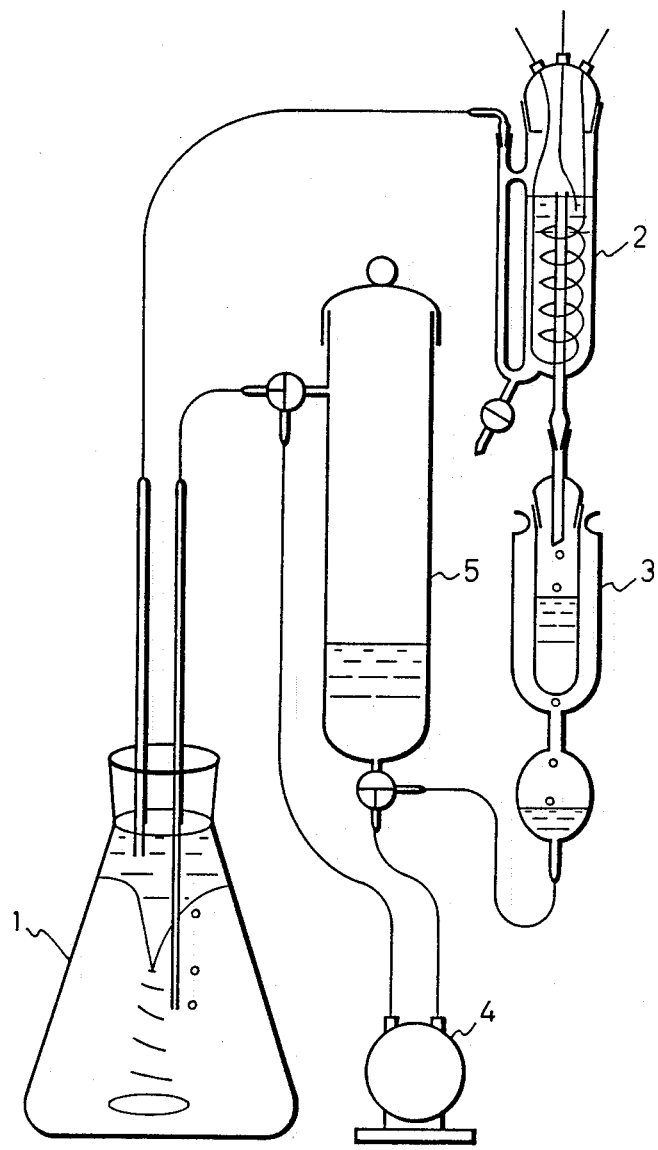
FIG. 1 is a diagram illustrating the apparatus used in the experiments.

Ruthenium tetroxide, a troublesome compound of ruthenium, is easily formed by oxidation. Ruthenium tetroxide is volatile and readily soluble in many organic solvents. For example, ruthenium tetroxide is stably dissolved in carbon tetrachloride. This property is utilized for the separation of ruthenium tetroxide. Furthermore, ruthenium tetroxide is adsorbed on the surface of many organic materials such as polyethylene and is reduced to form black ruthenium dioxide. This property is utilized for collecting and measuring radioactive ruthenium [Y. Koda, J. Radioanal. Chem., 6, 345 (1970)].

Based on the above, the inventor has made various investigations with the goal of developing means for preventing volatilization of ruthenium. The inventor arrived at the conclusion that prevention of volatilization is substantially impossible. As a result, a process was obtained found a process in which, according to procedures described hereinafter, ruthenium in an aqueous phase is extracted with an organic solvent safely and effectively and the extracted ruthenium is solidified. If ruthenium is extracted and removed, all of the above-mentioned problems caused by ruthenium at the extraction step or the step of concentration or solidification of HALW in the spent nuclear fuel reproducing system are solved.

The characteristic features of the present invention are as follows.

(1) An oxidizing agent is added to an aqueous solution containing ruthenium (which may be nitrosyl ruthenium) or this aqueous solution is electrolytically oxidized, whereby ruthenium is oxidized and ruthenium tetroxide is formed.

(2) The formed ruthenium tetroxide is extracted with a halogen-free aliphatic or alicyclic hydrocarbon solvent.

(3) The extracted ruthenium in the hydrocarbon solvent is readily reduced and gives fine particles of black ruthenium dioxide.

(4) If such fine particles of ruthenium dioxide are allowed to stand for a certain time or are heated, they are promptly agglomerated to form black flocs.

(5) Since the flocculent precipitates of ruthenium dioxide are covered with the hydrocarbon solvent, they are hydrophobic and are not dispersed in the aqueous phase but float in the solvent.

(6) Since the precipitates have the property that they are adsorbed in cellulose fibers and synthetic polymers such as polyethylene and polypropylene, they can be filtered easily and effectively by ordinary filter paper. Of course, the precipitates can be continuously separated by a centrifugal separation method.

(7) The hydrocarbon solvent left after the separation of the precipitates of ruthenium dioxide is apparently not damaged at all but can be used repeatedly. The extraction operation can be continuously performed by recycling the solvent by a pump.

(8) Ruthenium in the aqueous phase can be quantitatively removed in a short time and can be separated and collected as stable solid ruthenium dioxide, though the operation efficiency differs to some extent according to conditions such as the temperature of the extraction system, the kind and amount of the oxidant, the stirring condition, and the circulation speed of the solvent.

(9) The operation and apparatus are very simple, and industrial operation working of the process of the present invention can be easily accomplished.

The above-mentioned features will now be described in detail.

(1) At the step of oxidizing and extracting ruthenium, a lower acidity of nitric acid is more effective. At a nitric acid concentration of about 3M, commonly used in the reprocessing operation, ruthenium can be oxidized and extracted without any trouble. Incidentally, an acidity or nitric acid exceeding 6M is not preferred.

Compounds exemplified in the above-mentioned literature reference of Y. Koda and compounds having a higher oxidation potential than these compounds may be used as the oxidizing agent. In the practical reprocessing of a spent nuclear fuel, in view of corrosion of the apparatus, the use of a halogen compound such as a periodic acid salt or a bromic acid salt is not preferred. Use of a solid oxidizing agent such as $NaBiO_3$, AgO, or $PbO_2$ is not preferred from the operational viewpoint. In view of the solidification of HALW after the treatment, use of an oxidizing agent such as $(NH_4)_2S_2O_8$ is not recommended. Incidentally, a permanganic acid salt or a chromic acid salt does not show a sufficient oxidizing effect to ruthenium at a nitric acid acidity of 3M.

It was found that use of cerium (tetravalent), which is not influenced by the acidity and is contained in a considerable amount in the fission product, is acceptable and that use of a solution of its nitrate is simplest and most preferred. If there is present any reducing substance in the aqueous phase, it is preferred that cerium (tetravalent) be added in an amount of about 1.5 to about 2 equivalent to ruthenium. Even if cerium (tetravalent) is added in a large amount, the operation can be performed without any particular trouble, but if cerium is added in too large an amount, the amount of the waste is increased and the process becomes disadvantageous. If ruthenium is present in the form of a stable nitrosyl complex, i.e., a complicated complex form mainly containing a nitro complex of nitrosyl ruthenium, needless to say, cerium (tetravalent) is necessary for oxidation of the nitrosyl and nitro groups. Incidentally, in the case where excessively added cerium (tetravalent) causes any trouble at the subsequent treatment step, such cerium can be reduced by addition of an equivalent amount of hydrogen peroxide.

It is preferred that the extraction temperature be 50° to 60° C., though the reaction is advanced even at room temperature. In the case where ruthenium in the aqueous phase is present in the form of a stable nitrosyl complex, it is necessary that the aqueous solution be heated (up to 60° C. to 80° C.) in advance to be converted to a form which is easily extracted. In this case, if 30% hydrogen peroxide is added in an amount of about 1% by volume, the effect of degradation becomes higher. Where the removal of ruthenium through extraction is not satisfactory, the procedure should be repeated.

(2) Liquid paraffin is preferably used as the solvent for extracting ruthenium tetroxide. Normal paraffins having 11 to 18 carbon atoms are also suitably used because the vapor pressure is appropriate, the handling is very safe, and nitration or oxidative reduction is hardly caused. From the practical viewpoint, use of n-dodecane actually used at the reprocessing step is acceptable.

(3) It is considered that ruthenium tetroxide undergoes reduction by the hydrocarbon solvent at first.

(4) In order to agglomerate ruthenium dioxide formed in the solvent and facilitate the decomposition, it is preferred that after the extraction, the hydrocarbon solvent be heated or allowed to stand still for a certain time. In the case where the temperature of the extraction vessel is elevated, this operation is not necessary, and even if heating or the like is not performed agglomeration, ruthenium dioxide can be separated. It is preferred that the heating temperature be 80° to 90° C. If the heating temperature is higher than 100° C., there is a risk of bumping when a droplet of the aqueous phase carries into the system.

(5) The black precipitates are amorphous ruthenium dioxide and are chemically stable and hardly soluble in nitric acid. However, they are gradually dissolved in nitric acid containing an oxidizing agent such as cerium (tetravalent) or in a sodium hypochloride (NaOCl) solution.

(6) In view of the volume-reducing treatment to be conducted afterward, use of a filter material or filter aid formed of cellulose fibers is acceptable. If this filter material or filter aid is burnt after the treatment, ruthenium retains as a dioxide or metal and, thus, volatilization of ruthenium is not caused. If cellulose fibers are added when the centrifugal separation method is adopted, the separation can be performed more effectively.

(7) The solvent is oxidized by ruthenium tetroxide and is modified. However, the amount of the modified solvent is very small, and the extraction operation is not adversely influenced or no trouble is caused concerning safety. The oxidation products of normal paraffin with ruthenium tetroxide are various ketone derivatives.

(8) This extraction reaction is substantially irreversibly advanced and ruthenium is promptly removed from the aqueous phase.

The present invention will further be illustrated below with the reference to the following example.

EXAMPLE

FIG. 1 is a diagram illustrating an apparatus used in the experiments. Reference numeral 1 represents an extraction vessel (a beaker or flask having a capacity of 200 to 2000 ml). The charge in the extraction vessel can be stirred by a magnetic stirrer and can be heated. Reference numeral 2 represents a coagulation column of a $RuO_2$ suspension, which is equipped with a coiled heating wire (Nichrome wire) and a thermocouple (Chromel-Alumel) for controlling the temperature. Ordinarily, the temperature is controlled to 80° C. to 85° C. Reference numeral 3 represents a filter equipped with thimble shape filter made of cellulose fiber, which has a diameter of 30 mm and a height of 100 mm. Reference numeral 4 represents a gear pump made of stainless steel, which can change the flow rate of the solvent within the range of 80 to 350 ml/min. Reference numeral 5 represents a storage tank for a solvent.

The following experiments were carried out using the above-mentioned apparatus shown in FIG. 1.

A definite amount of a solution of ruthenium was placed in the extraction vessel (a beaker or flask having an appropriate capacity was selected according to the quantity of the solution). The pump was actuated to take out liquid paraffin from the storage tank and circulate the solvent in the system. The thickness of the liquid paraffin layer covering the aqueous phase in the extraction vessel was adjusted to about 5 cm, and the flow rate of the solvent was adjusted to about 100 ml/min. Stirring was performed so that water drops in the liquid paraffin were not flung upward into the circulation system. It was effective that the stirring was carried out so that liquid paraffin particles of a size of 0.5 to 3 mm were distributed throughout the aqueous phase. The temperature of the extraction vessel was about 60° C. and the temperature of the coagulation column was 85° to 95° C.

During a series of experiments, the amount of ruthenium in the ruthenium solution was adjusted to up to 50 g. The reason was that since the thimble shape filter used was small, if a large amount of ruthenium were filtered, the filtration pressure difference would increase and the liquid paraffin circulation would be greatly disturbed. Of course, if the substantial filtering area is increased by using a filtering aid such as filter pulp and the centrifugal separation is continuously carried out, even when a large quantity of ruthenium is present, no trouble is caused.

Extraction separation was effectively performed as the concentration of nitric acid was low. For example, the extraction coefficient at a nitric acid concentration of 0.5M was about 5 times as high as the extraction coefficient at a nitric acid concentration of 2M to 4M. However, a nitric acid concentration of 3M was actually adopted in the experiments, because, in practical nuclear fuel reprocessing, a nitric acid solution having a concentration of 2.5M to 3M is commonly used.

It is said that the ruthenium concentration in HALW or the like is 100 to 200 ppm. Moreover, removal of a minute amount of ruthenium is intended in the present invention. Accordingly, solutions having a ruthenium concentration lower than 200 ppm were tested in the present experiments.

An aqueous solution of ceric nitrate in an amount of 1.5 to 2.0 equivalents to ruthenium was added to initiate the extraction. Stirring was stopped at definite intervals (15 to 30 minutes) A small amount (ordinarily 1.5 ml) of the aqueous phase was sampled by a pipette. The amount of residual ruthenium was determined by high-frequency plasma emission spectroscopic analysis (ICP) or atomic absorption spectroscopy [K. Motojima et al., Anal. Chim. Acta., 183 (1986), 217]. The extraction removal effect was examined. The lower limits of the determination of these methods were 0.05 ppm, respectively.

The extraction removal test was performed according to the present invention on nitric acid-acidified aqueous solutions of ruthenium shown below. The time elapsed was plotted on the abscissa, and the amount (ppm) of ruthenium left in the aqueous solution was plotted on the ordinate (logarithmic scale).

(1) Ruthenium nitrate [$Ru(NO_3)_3$]

When ruthenium exists as a $Ru^{3+}$ ion, it can be readily and quickly removed by the process of the present invention.

Figure 2:
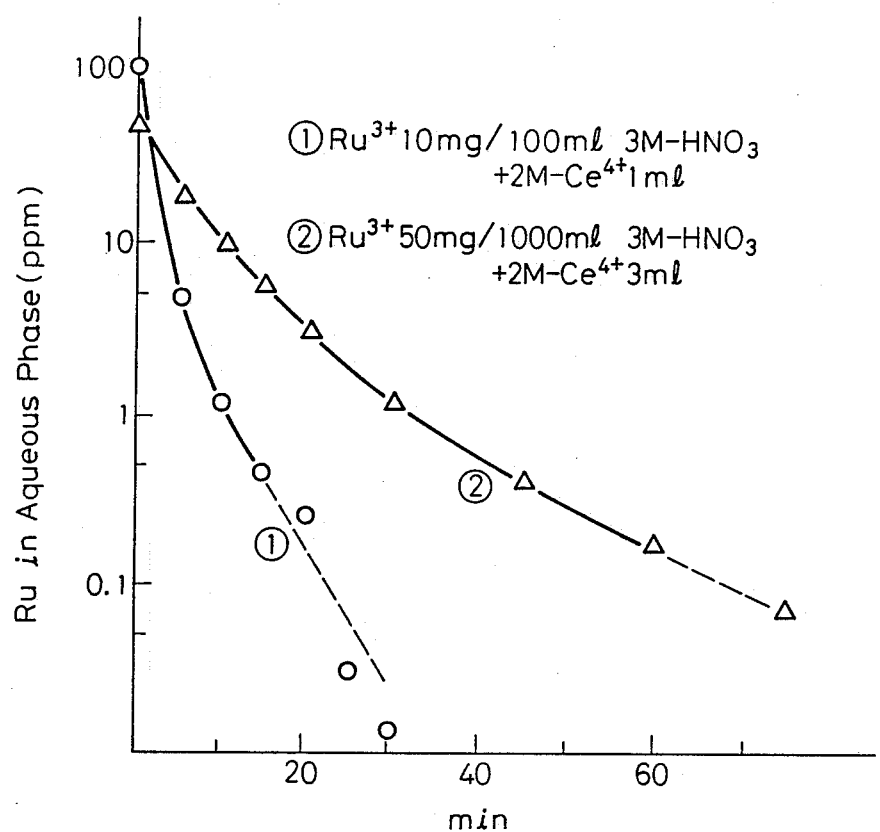
FIGS. 2 through 4 are graphs illustrating the results obtained in the example.

The experimental results are illustrated in FIG. 2.

In FIG. 2, curve ① indicates the case of 100 ml of a 3M nitric acid solution containing 10 mg of ruthenium (Ru: 100 ppm) treated with 1 ml of 2M ceric nitrate solution and stripped of ruthenium removed by the proposed process, and curve ② indicates the case of 1000 ml of a 3M nitric acid so containing 50 mg of ruthenium (Ru: 50 ppm) treated with 3 ml of a 2M ceric nitrate solution and similarly stripped of the ruthenium in the aqueous solution is removed. In these experiments, ruthenium was reduced to less than 0.1 ppm within about an hour.

(2) Nitrosylruthenium trinitro complex [$RuNO(NO_3)_3$]

Figure 3:
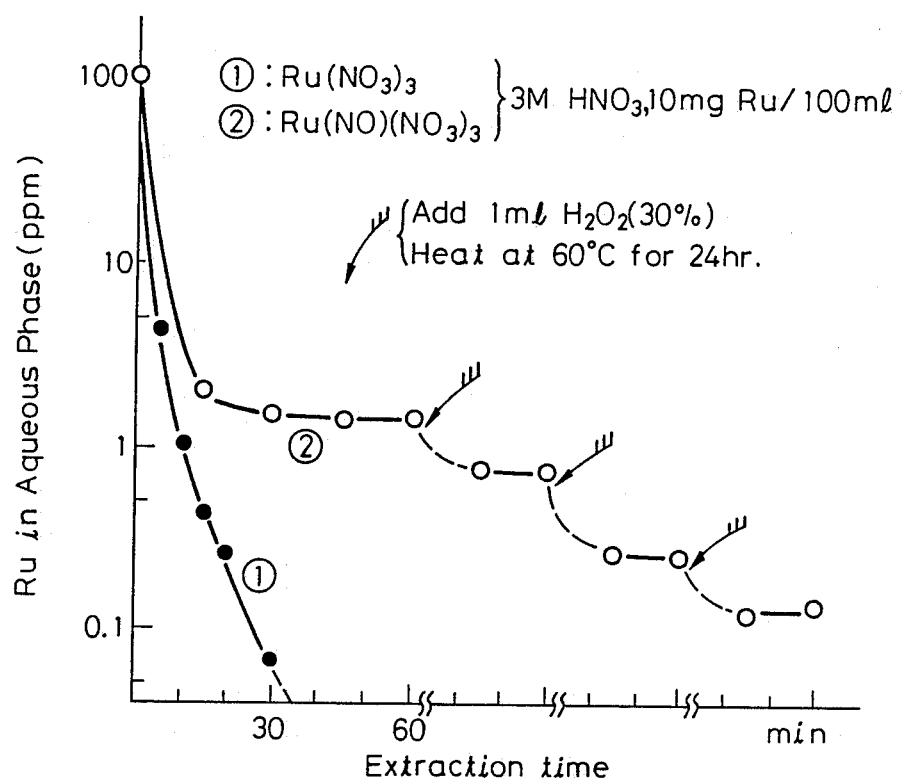

Various results were obtained due to the difference of the preparation method of the complex. When the solution of the complex was prepared by passing nitric oxide gas into a ruthenium nitrate nitric acid solution ($Ru^{3+}$: 100 ppm, 3M $HNO_3$), ruthenium in the solution could be easily removed as with the simple ruthenium ($Ru^{3+}$) nitrate (FIG. 3, curve ①).

When the complex solution is prepared by dissolving nitrosylruthenium hydroxide with nitric acid, several percent of ruthenium is difficult to remove by the process of the present invention. The reason seems that chemical forms of ruthenium in the solution are nitro-nitrate complexes. In this case, the effectiveness for the removal of ruthenium is so weak by further addition of ceric nitrate and extension of the extraction time is very weak. These complexes are thus converted effectively to an extractable chemical form by the addition of hydrogen peroxide and then aging for several hours.

In this case, after extraction for about 30 minutes by the proposed process, 1% by volume of hydrogen peroxide (30%), was added to the solution and the solution was allowed to stand for a day at 60° C., and then the extraction was repeated.

By this process, the ruthenium in the aqueous solution can be reduced to half or less. By repeating it 2 or 3 times, the ruthenium concentration can be reduced to less than a few $10^{-1}$ ppm. The experimental results are shown in FIG. 3, curve ②.

(3) Hydroxo-tetranitro-nitrosylruthenate (disodium salt $Na_2[RuNO(NO_2)_4OH]_2H_2O$ This complex is the most stable among nitrosyl ruthenium complexes, and ruthenium that forms this complex is difficult to remove by the simple process.

Some part of the complex can be decomposed by only heating in nitric acid above 60° C. for several hours, and a reaction is accelerated by the addition of hydrogen peroxide. Nevertheless, complete decomposition of the complex is difficult by the single hydrogen peroxide treatment, and considerable amounts of ruthenium remain after extraction. Several treatments are necessary to remove the ruthenium in the aqueous phase until it becomes less than 0.1 ppm.

Figure 4:
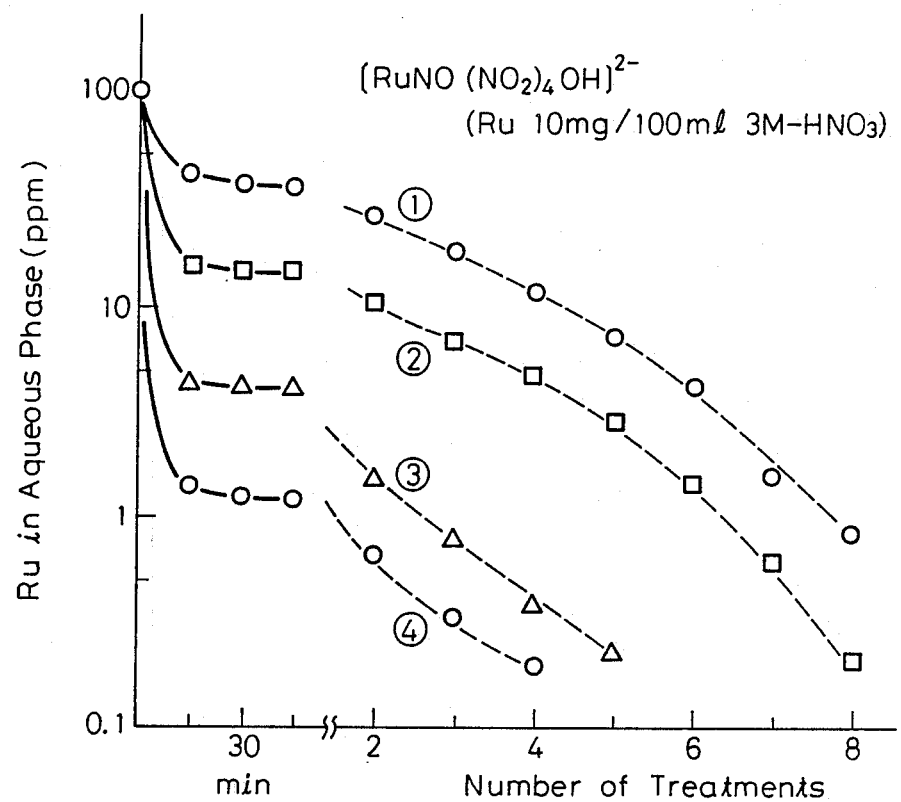

The experimental results are shown in FIG. 4.

Several 100 ml portions of a 3M nitric acid solution containing hyiroxotetranitro ruthenate disodium salt (Ru: 100 ppm) were treated with ① 0 ml, ② 1 ml, ③ 3 ml, and ④ 5 ml of hydrogen peroxide (30%), and heated at 60° C. for a day. The removal of ruthenium from these solutions was tested by the proposed process. After the first extraction, the aqueous phases were treated with 1 ml of hydrogen peroxide and aged as mentioned above. By several repeated treatments, the amount of ruthenium in the aqueous phase can be reduced less than 1 ppm.

(4) Effect of diverse materials

Several 3M nitric acid solutions containing simulated fission and corrosion materials were prepared by dissolving specific amounts of each metal nitrates.

The metals and their approximate concentrations (ppm) were as follows: Cs (800), Mo (500), Ba (400), La (400), Ce (200), Sr (200), Fe (200), Cr (30), Ni (20). In the case of the molybdenum, sodium molybdate was employed. By use of these solutions, extraction tests were performed. It was found that these materials do not interfere with the proposed process.

In the presence of large amounts of uranium (as $UO_2^{2+}$), such as more than 100 mg.ml$^{-1}$, the extraction of ruthenium into liquid paraffin was clearly observed.

(5) Extraction with n-dodecane

The above-mentioned procedures were repeated by using n-dodecane of a purity of higher than 99.9% instead of the liquid paraffin as the extraction and reduction solvent. The resulting effects of the ruthenium removal were substantially the same as those as mentioned above under items (1), (2) and (3). It was then confirmed from gas chromatographic analysis and gas-chromato-mass-spectrographic analysis that n-dodecane was oxidized by ruthenium tetroxide to 2-, 3-, 4-, 5- and 6-dodecanones in approximately amounts.

(6) Electrolytic oxidation

Figure 5:
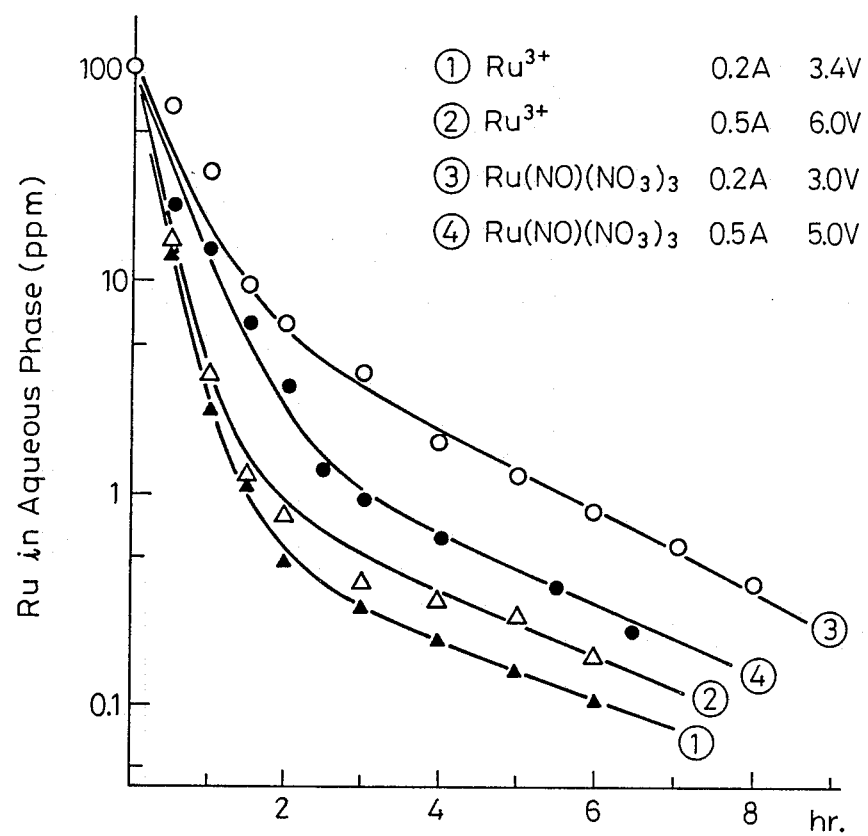

Electrolytic oxidation was carried out in an apparatus as shown in FIG. 1, wherein an anode of a platinum net (80 mesh) of a size of 200 mm×50 mm and a cathode of a platinum wire of a diameter of 0.5 mm and a length of 100 mm were inserted into the extraction vessel, by applying direct current between the electrodes to oxidize ruthenium to ruthenium tetroxide. The ruthenium teroxide was extracted with n-dodecane. The results of ruthenium removal obtained from the electrolytic oxidation of 3M nitric acid solutions of ruthenium nitrate $[Ru(NO_3)_3]$ and Nitrosylruthenium trinitrate $[Ru(NO)(NO_3)_3]$ (Ru: 100 ppm in both solutions) at 0.2 to 0.5 A and 3 to 4 V were shown in FIG. 5.

I claim:

1. A process for removing radioactive ruthenium from an aqueous solution, comprising oxidizing ruthenium in said aqueous solution to ruthenium tetroxide, extracting the resulting ruthenium tetroxide with a halogen-free aliphatic or alicyclic hydrocarbon solvent, allowing the ruthenium tetroxide to be reduced in the solvent, and separating the precipitated solid ruthenium dioxide.

2. The process as claimed in claim 1, wherein when ruthenium in the aqueous solution is a stable nitrosyl complex, the complex is converted into an easily extractable ruthenium compound by the addition of hydrogen peroxide and heating before extraction.

3. The process as claimed in claim 1, wherein tetravalent cerium is used as an oxidizing agent.

4. The process as claimed in claim 3, wherein tetravalent cerium is present in an amount of about 1.5 to about 2 equivelants to ruthenium.

5. The process as claimed in claim 1, wherein the oxidation of the ruthenium in the aqueous solution is carried out by electrolytic oxidation.

6. The process as claimed in claim 1, wherein a paraffinic hydrocarbon having about 11 to about 18 carbon atoms is used as the extraction solvent.

7. The process as claimed in claim 6, wherein the extraction solvent is n-dodecane.

8. The process as claimed in claim 1, wherein the liquid paraffin is used as the extraction solvent.

9. The process as claimed in claim 1, wherein after the extraction, the extraction solvent is heated or allowed to stand.

10. The process as claimed in claim 1, wherein the precipitated ruthenium dioxide is separated by filtration or centrifuging.

11. The process as claimed in claim 10, wherein the filtration is carried out using a filtering material or filtering aid composed of cellulose fibers.

12. The process as claimed in claim 1, wherein during the steps of oxidizing and extracting ruthenium, a nitric acid concentration in said aqueous solution is about 3M.

13. The process as claimed in claim 1, wherein during the steps of oxidizing and extracting ruthenium, a nitric acid concentration in said aqueous solution is about 6M or less.

14. The process as claimed in claim 1, wherein extracting the ruthenium tetroxide is conducted at a temperature of 50° to 60° C.

15. The process as claimed in claim 1, wherein extracting the ruthenium tetroxide is conducted at room temperature.

16. The process as claimed in claim 1, wherein extracting the ruthenium tetroxide is conducted at a temperature of 60° C. to 80° C. when ruthenium in the aqueous solution is in the form of a stable nitrosyl complex.

* * * * *